United States Patent
Kroker

(10) Patent No.: US 6,693,781 B1
(45) Date of Patent: Feb. 17, 2004

(54) CIRCUIT ARRANGEMENT OF A CONTROL DEVICE FOR MONITORING A VOLTAGE

(75) Inventor: Thomas Kroker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,901

(22) PCT Filed: May 20, 2000

(86) PCT No.: PCT/DE00/01624

§ 371 (c)(1),
(2), (4) Date: Apr. 9, 2002

(87) PCT Pub. No.: WO00/73883

PCT Pub. Date: Dec. 7, 2000

(30) Foreign Application Priority Data

May 24, 1999 (DE) ......................................... 199 24 318

(51) Int. Cl.$^7$ ................................................. H02H 3/18
(52) U.S. Cl. ....................................................... 361/78
(58) Field of Search ............................ 361/18, 78, 79, 361/90, 91, 92, 115

(56) References Cited

U.S. PATENT DOCUMENTS

| | | | |
|---|---|---|---|
| 3,789,242 A | | 1/1974 | Cantor |
| 4,951,171 A | | 8/1990 | Tran et al. |
| 5,291,387 A | * | 3/1994 | Ohshima ................. 363/56.11 |
| 5,426,553 A | * | 6/1995 | Kim ............................. 361/44 |
| 5,555,483 A | * | 9/1996 | Pressman et al. ............. 361/90 |
| 5,774,736 A | * | 6/1998 | Wright et al. ............... 713/330 |
| 5,786,641 A | * | 7/1998 | Nakanishi et al. ............ 307/64 |
| 5,818,201 A | * | 10/1998 | Stockstad et al. ........... 320/119 |
| 5,859,756 A | * | 1/1999 | Pressman et al. ............. 361/90 |
| 6,147,616 A | * | 11/2000 | Kim ........................... 340/657 |

FOREIGN PATENT DOCUMENTS

| | | |
|---|---|---|
| DE | 26 32 424 | 10/1977 |
| DE | 40 23 700 | 1/1992 |
| DE | 198 14 696 | 7/1999 |
| EP | 0 303 289 | 2/1989 |

* cited by examiner

Primary Examiner—Adolf D. Berhane
(74) Attorney, Agent, or Firm—Kenyon & Kenyon

(57) ABSTRACT

Described is a circuit arrangement of a control device for monitoring a voltage with regard to voltage deviations above a specific voltage value, and for outputting a reset signal for interlocking of output elements that are controlled by the control device if a voltage deviation above the voltage value arises. The arrangement includes an arrangement for generating a reference voltage, a first comparator for comparing the reference voltage with a first comparison voltage value, which is derived from the voltage to be monitored multiplied by a first proportionality factor, and for outputting the reset signal, and a second comparator.

To ensure that the circuit arrangement can monitor the voltage to be monitored with regard to whether it exceeds or is below two independent and freely definable comparison voltage values, it is proposed that the second comparator compare the reference voltage with a second comparison voltage value which is derived from the voltage to be monitored multiplied by a second proportionality factor, and it is proposed that the second comparator output the reset signal.

10 Claims, 3 Drawing Sheets

CIRCUIT ARRANGEMENT OF A CONTROL DEVICE FOR MONITORING A VOLTAGE

FIELD OF THE INVENTION

The present invention relates to a circuit arrangement of a control device for monitoring a voltage for voltage deviations above a specific voltage value, and for outputting a reset signal for interlocking of output elements that are controlled by the control device if a voltage deviation above the voltage value arises. The circuit arrangement includes an arrangement for generating a reference voltage, a first comparing element for comparing the reference voltage with a first comparison voltage value, which is derived from the voltage to be monitored multiplied by a first proportionality factor, and for outputting the reset signal, and a second comparing element.

BACKGROUND INFORMATION

A circuit arrangement is described in German Patent No. 40 23 700. This patent discloses a circuit arrangement for monitoring the frequency of a signal sequence of an electronic device, in particular of a microcomputer. The microcomputer controls output elements, e.g., the electrical components (sensors and actuators) of an internal combustion engine. The circuit arrangement for monitoring the frequency also includes a circuit arrangement for monitoring a voltage, e.g., the supply voltage of a microcomputer.

The circuit arrangement for monitoring a voltage that is known heretofore has a Zener diode for generating a reference voltage. The Zener diode is connected to a reference voltage, and also to ground via a resistor. The circuit arrangement also has a first comparing element, and a second comparing element that is designed as an operational amplifier. The first comparing element is used to monitor the supply voltage with regard to whether it exceeds an overvoltage threshold. The reference voltage is present at the positive input of the first comparing element. An overvoltage threshold which is picked off at a resistor of a voltage divider is present at the negative input of the first comparing element. The voltage divider is connected to the supply voltage and also to ground: By selecting the resistors of the voltage divider appropriately, it is possible to define a proportionality factor by which the supply voltage is multiplied in order to obtain the desired voltage value for the overvoltage threshold. The output for the first comparing element supplies a first reset signal for interlocking the output elements in the event of a problem, i.e., if the supply voltage exceeds the overvoltage threshold.

The reset signal is present at the positive input of the second comparing element. The reference voltage is present at the negative input of the second comparing element. A second reset signal for interlocking peripheral components is present at the output of the second comparing element. The second reset signal is only present if the reference voltage is greater than the voltage of the first reset signal.

Thus in the circuit arrangement that is known heretofore it is only possible to monitor a voltage with regard to whether it exceeds an overvoltage threshold. It is not possible to simultaneously monitor the voltage with regard to whether it is below an undervoltage threshold. Furthermore, in the circuit arrangement that is known heretofore, a problem arises when the circuit arrangement is powered up (Power-On-Fall), because as the supply voltage increases the two comparing elements remain in a non-defined state until their operating voltage is reached. This non-defined state of the comparing elements can cause the circuit arrangement for monitoring a voltage to function improperly.

SUMMARY OF THE INVENTION

An object of the present invention is to design and further improve the circuit arrangement of the type described above so that the circuit arrangement can monitor the voltage to be monitored with regard to whether it exceeds or, respectively, is below two independent and freely definable comparison voltage values.

To achieve this object, based on the circuit arrangement of the type described above, the present invention proposes that the second comparing element compare the reference voltage with a second comparison voltage value that is derived from the voltage to be monitored multiplied by a second proportionality factor, and proposes that the second comparing element output the reset signal.

The present invention recognizes the fact that, in order to monitor the voltage value to be monitored with regard to whether it exceeds an independent overvoltage threshold as well as with regard to whether it is below an independent undervoltage threshold, the two comparing elements cannot be coupled to one another.

For this reason, according to the present invention a separate comparison voltage value that is freely definable via the proportionality factor is present at each of the two comparing elements. The circuit arrangement according to the present invention monitors a voltage with regard to positive and negative voltage deviations that are outside a voltage window that is delimited by the two comparison voltage values. If the voltage that is to be monitored exceeds or is below the respective comparison voltage values, a reset signal for interlocking the output elements is present at the output of at least one of the comparing elements. In this way, if there is an overvoltage or undervoltage in the voltage to be monitored, is possible to keep the output elements from performing switching in a undefined manner due to the computer core operating in an undefined manner.

The voltage to be monitored is preferably the supply voltage of the computer core.

According to a useful further refinement of the present invention, it is proposed that the circuit arrangement have two voltage dividers which are connected to the voltage to be monitored and to ground, it being possible to pick off the comparison voltage values at a pick-off of each of the voltage dividers. It is possible to freely define the proportionality factor by choosing the resistors of a voltage divider appropriately. The comparison voltage value present at the comparing element can be adjusted by multiplying the voltage to be monitored by the proportionality factor.

Because in the circuit arrangement according to the present invention a separate voltage divider is assigned to each comparing element, the comparison voltage values present at the two comparing elements can be freely chosen, independently of one another. In this way it is possible to define any voltage window having an upper, overvoltage threshold and a lower, undervoltage threshold within which the voltage to be monitored is to lie in the normal case. As soon as the voltage moves outside this voltage window, the reset signal is activated and the output elements are interlocked.

Accordingly, according to a preferred embodiment of the present invention, it is proposed that the resistors of the voltage divider be chosen so that the first comparison voltage value at the pick-off of the first voltage divider constitute an overvoltage threshold, and the second comparison voltage value at the pick-off of the second voltage divider constitute an undervoltage threshold.

According to a particularly useful embodiment of the present invention, the comparing elements are comparators. A comparator is embodied, for example, as a high-sensitivity, non-negative-feedback difference amplifier. The output of a comparator that is connected in tri-state mode (open collector) is at a high potential (HI) when in idle state. Depending on how the inputs of the comparator are connected, the comparator switches to a low potential (LO) when a comparison voltage threshold is exceeded or when voltage is lower than a comparison voltage threshold.

It is advantageous that in the case of the first comparator the reference voltage is present at the positive input and the first comparison voltage value is present at the negative input, and in the case of the second comparator the reference voltage is present at the negative input and the second comparison voltage value is present at the positive input. The first comparator thus monitors whether the voltage to be monitored exceeds an overvoltage threshold. If so, the output of the first comparator switches to LO. The second comparator monitors whether the voltage to be monitored is below an undervoltage threshold and if necessary switches its output to LO.

The arrangement for generating a reference voltage are preferably embodied as a reference voltage diode.

According to a useful further refinement of the present invention, the collector of a transistor whose emitter is connected to the voltage to be monitored and whose base is connected to a first connector of a computer of the control device and is connected via a pull-down resistor to ground, is connected to the pick-off of the first voltage divider. Furthermore, it is proposed that the collector of a transistor whose emitter is connected to ground and whose base is connected to a second connector of a computer of the control device and is connected via a pull-down resistor to the voltage to be monitored, be connected to the pick-off of the second voltage divider.

The transistors that are connected in series with the voltage dividers ensure that when the supply voltage of the control device is powered up the comparators are in a defined state. During powering up of the control device, the supply voltage of the control device does not increase abruptly from one instant to the next but rather increases continuously over a fairly long period. As the comparators only work reliably at and above a certain operating voltage, there is a danger that the comparators will enter a non-defined state during powering up of the control device and before the operating voltage has been reached. By contrast, the transistors start working at an operating voltage that is significantly below the comparators' operating voltage. Therefore during powering up of the control device, first the transistors start operating at their operating voltage and bring the comparators to a defined state. Furthermore, the transistors are connected so that they are in a defined state even if they have not reached their operating voltage.

According to another useful embodiment of the present invention, it is proposed that the computer of the control device send an initialization signal for enabling the output elements to the connectors to the circuit arrangement, provided the computer is in a reliable working state. As the comparators only start working reliably at a certain operating voltage, there is a danger that the comparators may take on a non-defined state during powering up of the control device and before the operating voltage is reached. To prevent this, in the case of the circuit arrangement according to the present invention the comparators do not work until initialization signals from the computer are present at the connectors to the circuit arrangement.

DETAILED DESCRIPTION

Figure 1:
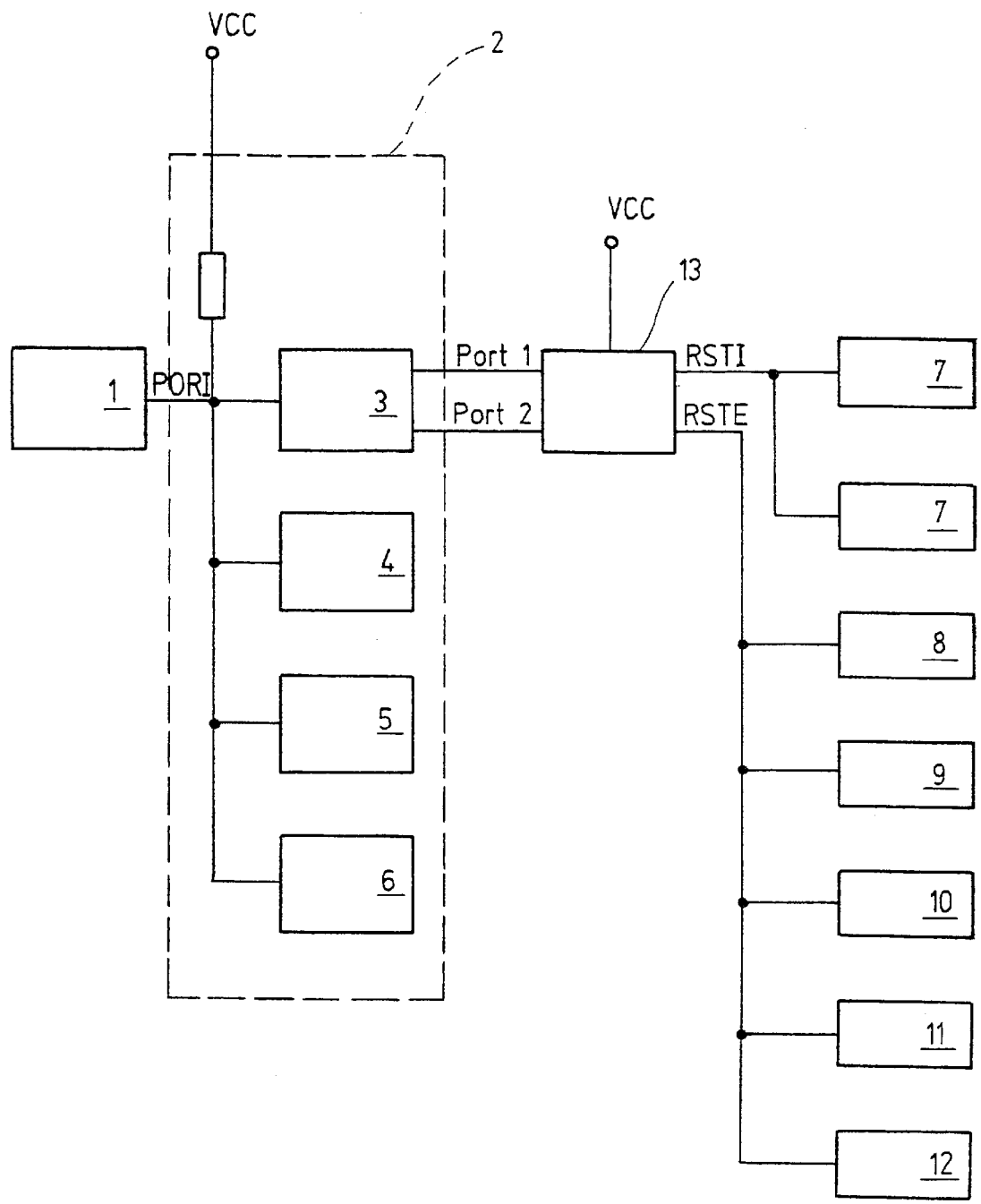
FIG. 1 shows a block diagram of a reset path for a control device, a circuit arrangement according to the present invention being symbolically shown.

FIG. 1 shows a block diagram of a reset path for a control device, which controls an internal combustion engine of a motor vehicle via a plurality of output elements (7 to 12). The control device controls in particular injectors of the internal combustion engine, exhaust gas recirculation final control elements, pressure closed-loop controllers for the common-rail pressure, electric fuel pumps, variable turbo geometries and air conditioning compressors.

The control device has stabilizer 1, which delivers a supply voltage VCC=5 V that is constant per se to computer 2. Computer 2 includes computer core 3, programmable logic devices (PLDs) 4 embodied, for example, as a gate array, EEPROMs 5 and flash EPROMs 6. Computer 2 is specified for a supply voltage range of 4.5 V to 5.5 V. Computer 2 does not function reliably with a supply voltage VCC that lies outside this range. Therefore for safety reasons the output elements triggered by the control device are switched off as soon as supply voltage VCC moves outside the 4.5 V to 5.5 V range.

Supply voltage VCC may, for example during powering up of the control device or if there is a defect in stabilizer 1, deviate from its nominal value VCC=5 V to such a degree that it moves outside the 4.5 V–5.5 V supply voltage range. A defect in the voltage closed-loop controller in stabilizer 1 may result in an overvoltage, and a short circuit in stabilizer 1 may under certain circumstances result in an undervoltage.

Stabilizer 1 has an undervoltage reset, which in the case of a supply voltage VCC of less than 4.6 V (VCC<4.6 V) carries out a reset at computer core 3, PLDs 4, EEPROMs 5 and flash EPROMs 6 via connector PORI. In such an instance, there are no initialization signals present at connectors Port1 and Port2 of computer 2 (tri-state).

Figure 2:
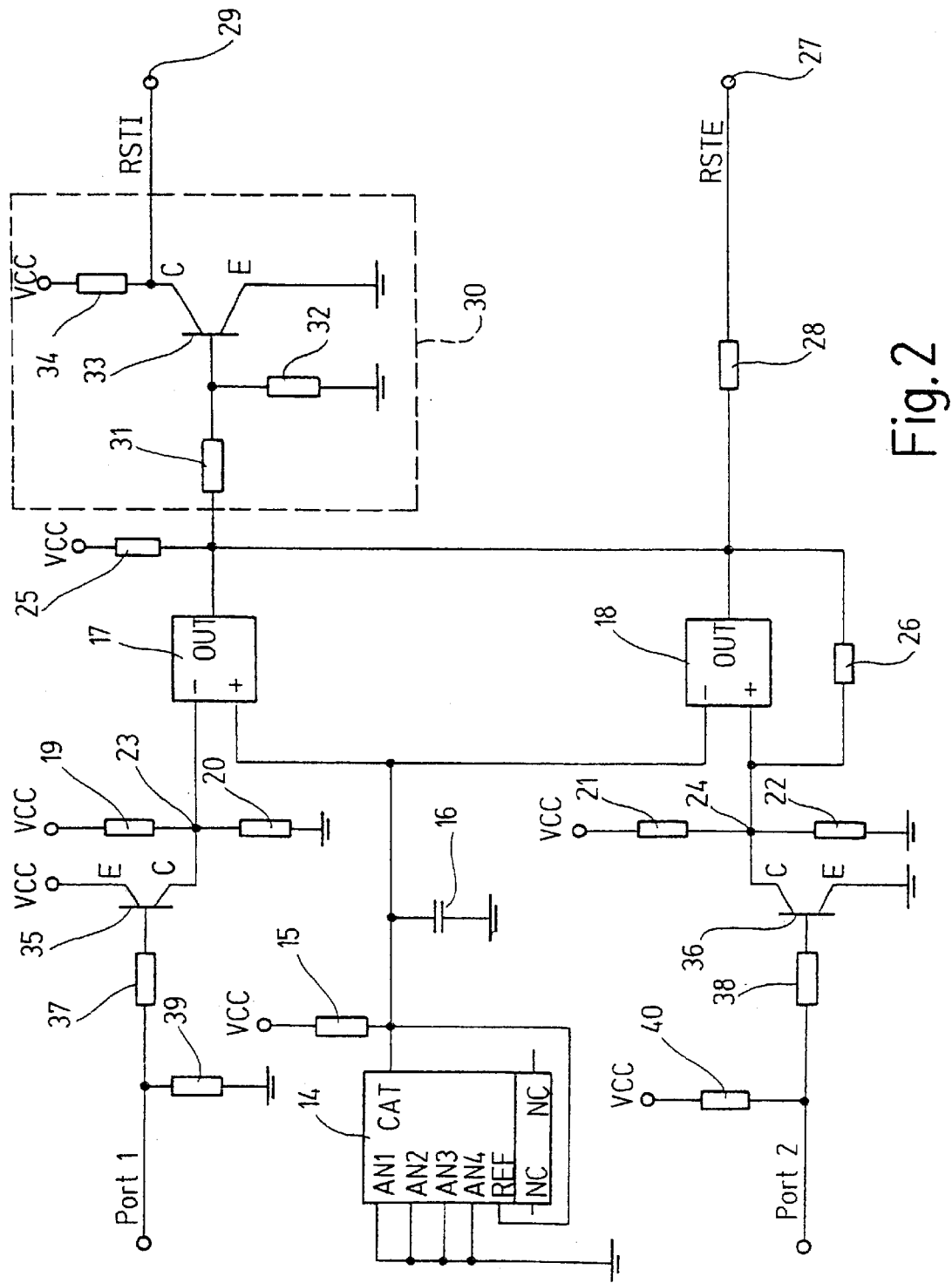
FIG. 2 shows a circuit arrangement according to the present invention per a first embodiment.

Furthermore, the control device has a circuit arrangement 13 according to the present invention, which is symbolically shown in FIG. 1 and shown in detail in FIG. 2. The task of circuit arrangement 13 is to safely interlock output elements 7 to 12 that are controlled by the control device if computer 2 of the control device is not in a defined state, i.e., if supply voltage CC lies outside the 4.5 V–5.5 V range. To accomplish this, circuit arrangement 13 monitors supply voltage VCC and sends reset signal RSTE to output elements 8 to 12 and inverted reset signal RSTI to injectors 7 if supply voltage VCC is below an undervoltage threshold or above an overvoltage threshold. Reset signals RSTE and RSTI of circuit arrangement 13 are not enabled until initialization signals from computer 2 are received at connector Port1 and Port2.

Circuit arrangement 13 (see FIG. 2) has reference voltage diode 14, which generates a constant reference voltage VREF of nominally 2.5 V. Reference voltage VREF remains constant provided supply voltage VCC is at least 2.5 V. If supply voltage VCC falls below 2.5 V, reference voltage VREF falls along with supply voltage VCC, to 0 V. Reference voltage VREF is present at connector REF of reference voltage diode 14. Connectors AN1 to AN4 of reference voltage diode 14 are connected to ground. Connectors NC of reference voltage diode 14 are not connected (NC). Capacitor 16 of is connected in parallel with reference voltage diode 14, which is connected to ground. Connector REF of reference voltage diode 14 is connected via resistor 15 to supply voltage VCC. Resistor 15 is used to limit the current that flows through reference voltage diode 14. The capacitor is used to eliminate reference voltage diode 14's tendency towards oscillation.

The reference voltage is applied to the positive (+) input of first comparator 17, which monitors supply voltage VCC with regard to whether it exceeds an overvoltage threshold, and to the negative (−) input of a second comparator 18, which monitors supply voltage VCC with regard to whether it is below an undervoltage threshold. The two comparators 17, 18 are embodied as a dual comparator having open-collector output OUT.

A voltage which is set at pick-off 23 between two resistors 19, 20 is present at the (−) input of first comparator. The two resistors 19, 20 are connected between supply voltage VCC and ground and form a voltage divider. The voltage that arises at pick-off 23 is thus dependent on supply voltage VCC and the resistance values of the two resistors 19, 20. By selecting the two resistors 19, 20 in an appropriate manner, it is possible to set an overvoltage threshold of supply voltage VCC. In the present exemplary embodiment, resistors 19, 20 are chosen so that an overvoltage threshold of 5.5 V is set. More precisely, resistors 19, 20 are chosen so that a voltage that is less than reference voltage VREF, provided supply voltage VCC remains below 5.5 V, is present at pick-off 23.

Similarly, a voltage which is set at pick-off 24 between two resistors 21, 22 of a voltage divider is present at the (+) input of second comparator 18. As before, the two resistors 21, 22 are connected to supply voltage VCC and to ground. The voltage that is set at pick-off 24 is dependent on supply voltage VCC and the resistance values of the two resistors 21, 22. If the two resistors 21, 22 are chosen in a appropriate manner, a undervoltage threshold of supply voltage VCC can be set. In the present exemplary embodiment, resistors 21, 22 are chosen so that an undervoltage threshold of 4.5 V is set. More precisely, resistors 21, 22 are chosen so that a voltage that is greater than reference voltage VREF, provided supply voltage VCC remains above 4.5 V, is present at pick-off 24.

Thus using the circuit arrangement 13 according to the present invention, it is possible to monitor supply voltage VCC with regard to whether an overvoltage threshold is exceeded and with regard to whether voltage is below an undervoltage threshold. The overvoltage threshold and the undervoltage threshold can both be set independently of one another.

As comparators 17, 18 are connected in the tri-state mode, output OUT of one of comparators 17; 18 is switched by resistor 25 to HI (a high potential) when comparator 17; 18 is in idle state. Output OUT of first comparator 17 then switches to LO (a low potential) if the voltage from pick-off 23 present at the (−) output is greater than the reference voltage VREF present at the positive input, i.e., if supply voltage VCC has moved above the overvoltage threshold. Similarly, output OUT of second comparator 18 switches to LO if the voltage from pick-off 24 present at the (+) input is less than the reference voltage VREF present at the (−) input, i.e., if supply voltage VCC has fallen below the undervoltage threshold. Outputs OUT of comparators 17, 18 are connected via pull-up resistor 25 to supply voltage VCC. Pull-up resistor 25 is required to bring about the HI state at outputs OUT of comparator 17, 18.

Hysteresis resistor 26 is connected between the (+) input and output OUT of second comparator 18. Hysteresis resistor 26 is only provided in the undervoltage path because the undervoltage threshold can be passed not only from above (if supply voltage VCC falls from a value above the undervoltage threshold (e.g., 5 V) to a value below the undervoltage threshold, e.g., 4 V), but also from below when the control device powers up causing supply voltage VCC to increase. In the case of powering up, due to the hysteresis, an undervoltage is also detected beyond a supply voltage VCC of <4.5 V, up to a supply voltage VCC of <4.7 V.

The LO state at output OUT of comparator 17, 18 corresponds to the reset signal RSTE. Limitation resistor 28 is connected in series between connector 27 of circuit arrangement 13 at which reset signal RSTE is present and comparators 17, 18. In the event of a fault of one of the output elements 7 to 12, limitation resistor 28 is used to limit the current, which under certain circumstances flows back from the output element 7 to 12 having the fault into circuit arrangement 13, to the maximum drop-off current of the comparator 17; 18. In the present exemplary embodiment, limitation resistor 28 is chosen so that the current that flows back is limited to 16 mA.

Inverted reset signal RSTI is present at a connector 29 of circuit arrangement 13. In order to obtain inverted reset signal RSTI from reset signal RSTE, inverter 30 is arranged between connector 29 and comparators 17, 18. Inverter 30 has a first resistor 31 which is connected in series, a second resistor 32 which is connected to ground, and transistor 33, whose emitter is connected to ground and whose collector is connected to supply voltage VCC via third resistor 34. Connector 29 is picked off at the collector of inverter 30.

If a reset signal RSTE in LO state is present at the input of inverter 30, transistor 33 is in the non-conductive state, and at connector 29 supply voltage VCC is present via resistor 34, which corresponds to the HI state. By contrast, if a reset signal RSTE in HI state is present at the input of inverter 30, transistor 33 switches to its conductive state and connector 29 is connected to ground, which corresponds to the LO state.

During powering up of the voltage supply of the control device, supply voltage VCC does not increase abruptly from one instant to the next, but rather continuously over a fairly long period of time, in the case of the present exemplary embodiment this increase being from 0 V to 5 V. As comparators 17, 18 only work reliably at and above a specific supply voltage VCC (operating voltage), there is a danger that during powering up of the control device comparators 17, 18 will enter a non-defined state before the operating voltage is reached. To prevent this, according to the present invention in circuit arrangement 13 comparators 17, 18 only function in response to initialization signals from computer 2 at connectors Port1 and Port2. The initialization signals are as follows: Port1 switched to HI and Port2 switched to LO. These initialization signals prevent a situation where during powering up of the control device's voltage supply output elements 7 to 12 are enabled before computer 2 is working reliably.

In order to process the initialization signals, the collector of a transistor 35, 36 is connected to pick-offs 23, 24. The emitter of transistor 35 is connected to supply voltage VCC and the emitter of transistor 36 is connected to ground. Between transistors 35, 36 and Port1 and Port2 respectively a series resistor 37, 38 is connected in series. Port1 is connected to ground via pull-down resistor 39. Port2 is connected to supply voltage VCC via pull-down resistor 40. In order to enable output elements 7 to 12, four conditions are to be met:

supply voltage VCC>undervoltage threshold;
supply voltage VCC<overvoltage threshold;
Port1 is at HI;
Port2 is at LO.

A transistor starts to function reliably at an operating voltage of about 1 V, and as a general rule even at an operating voltage of 0.7 V and above. The operating voltage of a transistor lies below that of a comparator or operational amplifier. Therefore, during powering up of the control device, transistors 35, 36 reach their operating voltage first. As a result, comparators 17, 18 can be brought to a defined state by transistors 35, 36. Transistors 35, 36 are connected so that they are in a defined state even if they have not yet reached their operating voltage. Therefore with the circuit arrangement according to the present invention it is possible to ensure that comparators 17, 18 are in a defined state even when the control device is powering up, before the control device has reached switched-on status.

A person skilled in the art can implement the present circuit arrangement 13 in many different ways. All these types of implementation are covered by the subject matter of the present invention. In particular, it is feasible to use operational amplifiers instead of comparators 17, 18. Furthermore, reset signal RSTE can be inverted by a retriggerable monostable flip-flop (RS flip-flop) instead of by inverter 30. It is also feasible to use a Zener diode instead of reference voltage diode 14.

Figure 3:
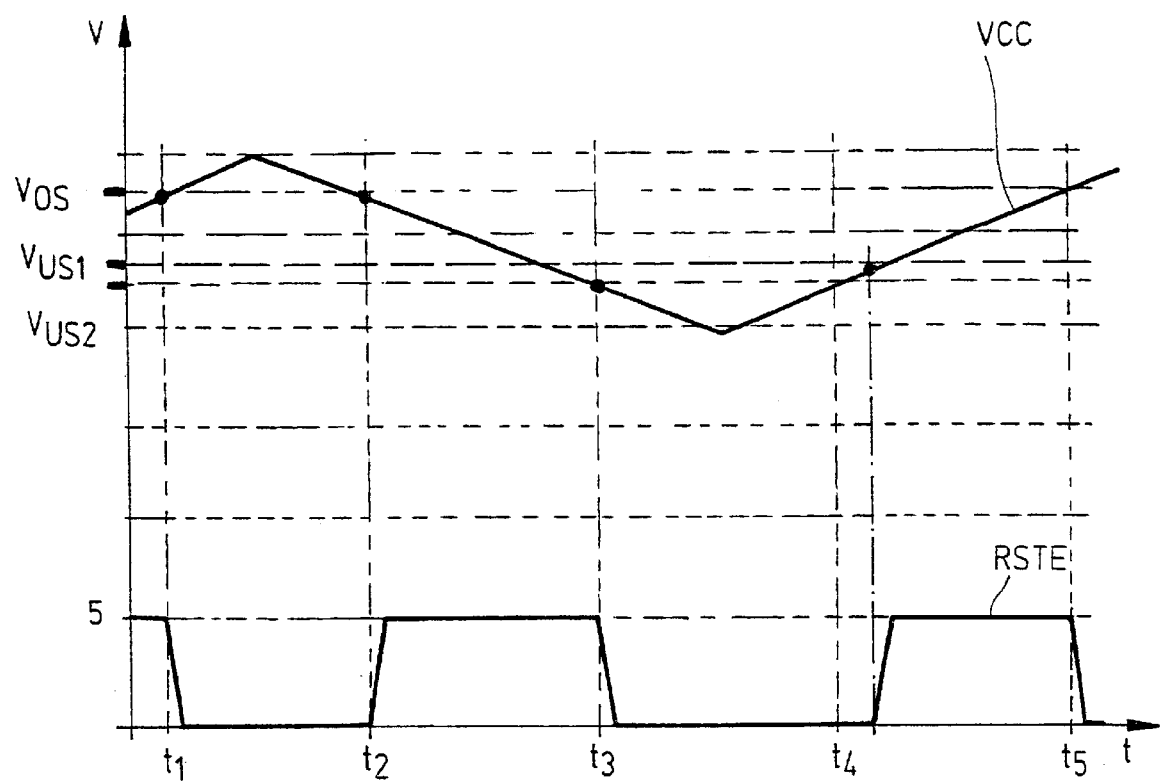
FIG. 3 shows a curve for selected signals in the case of the circuit arrangement per FIG. 2.

FIG. 3 shows an exemplary graph for supply voltage VCC and the resulting reset signal RSTE that arises in the case of the circuit arrangement 13 according to the present invention. A triangular signal having an offset of 5 V and an amplitude of VPP=2 V has been chosen for supply voltage VCC. Thus supply voltage VCC fluctuates between 4 V and 6 V. Overvoltage threshold VOS has been set at 5.5 V and undervoltage threshold VUS at 4.5 V. As comparators 17, 18 are in the tri-state mode, output OUT of a comparator 17; 18 in the idle state of the comparator 17; 18 and thus also reset signal RSTE are at HI. The idle state is present if supply voltage VCC lies within the voltage window that is delimited by overvoltage threshold VOS and undervoltage threshold VUS. In the idle state of comparator 17, 18, output elements 7 to 12 are enabled if additionally Port1 is at HI and Port2 is at LO.

At the beginning (t<t1) of the signal graph shown in FIG. 3, supply voltage VCC lies within the voltage window, and the reset signal is at HI. At instant t1, supply voltage VCC moves above overvoltage threshold VOS. As a result, reset signal RSTE switches from HI to LO and output elements 7 to 12 are interlocked. Supply voltage VCC continues to rise, reaches its maximum 6 V and then falls again until, at instant t2, it falls below overvoltage threshold VOS and reenters the voltage window. As a result, reset signal RSTE switches back to HI and output elements 7 to 12 are once again enabled, provided the initialization signals are present at Port1 and Port2, i.e., provided Port1 is at HI and Port2 is at LO.

Supply voltage VCC continues to fall, until, at instant t3, it falls below undervoltage threshold VUS2, and as a result reset signal RSTE switches from HI to LO and interlocks output elements 7 to 12 again. At instant t4, supply voltage VCC moves above undervoltage threshold VUS1 and reset signal RSTE switches back to HI. Output elements 7 to 12 are then enabled again, provided the initialization signals are present at Port1 and Port2. The difference between VUS1 and VUS2 is the hysteresis that arises as a result of hysteresis resistor 26. Finally, at instant t5, supply voltage VCC moves above overvoltage threshold VOS once again, the reset signal switches from HI to LO, and output elements 7 to 12 are interlocked.

What is claimed is:

1. A circuit arrangement of a control device for monitoring a voltage with regard to a voltage deviation above a specific voltage value, and for outputting a reset signal for achieving an interlocking of output elements that are controlled by the control device if the voltage deviation above the specific voltage value arises, the circuit arrangement comprising:

an arrangement for generating a reference voltage;

a first comparator for comparing the reference voltage with a first comparison voltage value, the first comparison voltage being derived from the voltage to be monitored multiplied by a first proportionality factor, and for outputting the reset signal; and a second comparator for comparing the reference voltage to a second comparison voltage value that is derived from the voltage to be monitored multiplied by a second proportionality factor, the second comparator outputting the reset signal.

2. The circuit arrangement according to claim 1, further comprising:

two voltage dividers connected to the voltage to be monitored and to ground, wherein:
the first comparison voltage value and the second comparison voltage value are picked-off at respective pick-offs of the two voltage dividers.

3. The circuit arrangement according to claim 2, wherein:

a first one of the two voltage dividers includes a first one of the pick-offs, a second one of the two voltage dividers includes a second one of the pick-offs, and resistors of the two voltage dividers are selected so that:
the first comparison voltage value at the first one of the pick-offs corresponds to an overvoltage threshold, and
the second comparison voltage value at the second one of the pick-offs corresponds to an undervoltage threshold.

4. The circuit arrangement according to claim 1, wherein:

the reference voltage is present at a positive input of the first comparator and the first comparison voltage value is present at a negative input of the first comparator, and the reference voltage is present at a negative input of the second comparator and the second comparison voltage value is present at a positive input of the second comparator.

5. The circuit arrangement according to claim 1, wherein:

the arrangement for generating the reference voltage includes a reference voltage diode.

6. The circuit arrangement according to claim 3, further comprising:

a pull-down resistor; and a transistor, including:
a collector connected to the first one of the pick-offs,
an emitter connected to the voltage to be monitored, a base connected to a first connector of a computer of the control device and connected via the pull-down resistor to ground.

7. The circuit arrangement according to claim 3, further comprising:
   a pull-down resistor; and
   a transistor, including:
      a collector connected to the second one of the pick-offs,
      an emitter connected to ground, and
      a base connected to a second connector of a computer of the control device and connected via the pull-down resistor to the voltage to be monitored.

8. The circuit arrangement according to claim 6, wherein:
   the computer of the control device sends an initialization signal to the first connector in order to enable the output elements if the computer is in a reliable working state.

9. The circuit arrangement according to claim 7, wherein:
   the computer of the control device sends an initialization signal to the second connector in order to enable the output elements if the computer is in a reliable working state.

10. The circuit arrangement according to claim 1, wherein:
   the voltage to be monitored includes a supply voltage of the control device.

* * * * *